United States Patent [19]

Lauder

[11] 3,897,367

[45] July 29, 1975

[54] METAL OXIDE CATALYTIC COMPOSITIONS

[75] Inventor: Alan Lauder, Newark, Del.

[73] Assignee: E. I. du Pont de Nemours & Company, Wilmington, Del.

[22] Filed: Oct. 10, 1973

[21] Appl. No.: 405,052

[52] U.S. Cl. .......... 252/462; 423/213.2; 423/213.5; 423/594
[51] Int. Cl. ......................... B01j 11/08; B01j 11/22
[58] Field of Search ........ 252/462, 466 B, 472, 473, 252/474; 423/213.2, 593, 594, 213.5

[56] References Cited
UNITED STATES PATENTS

| | | | |
|---|---|---|---|
| 3,331,787 | 7/1967 | Keith et al. ..................... | 252/477 R |
| 3,644,147 | 2/1972 | Young .............................. | 136/86 D |
| 3,780,126 | 12/1973 | Manning ......................... | 252/471 X |

FOREIGN PATENTS OR APPLICATIONS 2,119,702   11/1971   Germany ............................ 252/462

*Primary Examiner*—Winston A. Douglas
*Assistant Examiner*—W. J. Shine

[57] ABSTRACT

Compounds having the perovskite-type $ABO_3$ structure wherein 1 to 20% of the B site cations are Ru or Pt, the remainder consisting essentially of cobalt, preferably partially tetravalent and the A sites being occupied by a mixture of lanthanide ions and ions of Group IA, IIA, and IVA of the Periodic Table having an ionic radius of about 0.9 to about 1.65 A are useful catalysts for reduction and oxidation reactions, particularly for the cleanup of exhaust gases of internal combustion engines.

7 Claims, 2 Drawing Figures

METAL OXIDE CATALYTIC COMPOSITIONS

BACKGROUND OF THE INVENTION

1. Field of the Invention

This invention relates to novel metal oxide compounds having the perovskite-type crystal structure and containing cobalt and ruthenium or platinum, useful as catalysts.

2. The Prior Art

Much effort has been expended in recent years in the development of improved heterogenous catalysts for chemical reactions, particularly for the partial or complete oxidation of volatile carbon compounds in air and for the reduction of nitrogen oxides to nitrogen by hydrogen, carbon monoxide, and other carbon compounds. Such efforts have been directed toward the development of more effective catalysts for use in the manufacture of organic chemicals and for the reduction of atmospheric pollution by industrial processes but have also been largely directed toward the reduction of atmospheric pollution by exhaust gases from internal combustion engines. Catalysts useful in such processes will desirably be low in cost, selective in promoting desired oxidation and/or reduction reactions at relatively low temperatures, active for long periods at the temperatures involved and in the presence of the materials incidental to these reactions, simple to prepare in suitable forms having high catalytic activity, and active at relatively low surface areas per unit weight of catalytic material and will also desirably have other properties well recognized in the art.

Libby (Science 171 499, 2–5–71, and 176 1355, 6–2–3–72) showed that lanthanum cobaltite, neodymium cobaltite, dysprosium cobaltite, and a similar cobaltite containing a mixture of ions of rare earth metals are effective heterogenous catalysts for the hydrogenation and hydrogenolysis of cis-2-butene and suggested that these materials and similar perovskite metal oxides doped with metal ions having other valences (e.g., $Sr_{0.2}La_{0.8}CoO_3$) be considered for use as automotive exhaust oxidation catalysts.

Balgord et al. (New York State Dept. of Environmental Conservation, Technical Paper 18, 5–71) showed that lanthanum cobaltite is catalytically active in the reaction of nitrogen oxides with carbon monoxide to form nitrogen and suggested that thermally stable crystalline oxides of metals having facile changes in valence and able to adjust to wide ranges of oxygen partial pressure are expected to be active catalysts in this reaction.

Voorhoeve et al. (Science 177 354, 7–28–72, and 180 62, 4–6–73) showed that lanthanum cobaltite and praseodymium cobaltite, are active catalysts for the oxidation of carbon monoxide by oxygen, showed that these oxides promote the reduction of nitrogen oxides by mixtures of carbon monoxide, hydrogen, and water to form nitrogen (with nitrous oxide rather than ammonia as the main side-product), and suggested that these oxides be used both for reduction of nitrogen oxides and for oxidation of carbon compounds in exhaust gas purification.

While the rare earth cobaltites, and other such compositions recently proposed by Libby, Voerhoeve, and others for use as catalysts for the purification of automotive exhaust gases have advantages over the earlier-proposed materials, there is a need for catalytic compositions which have these and other advantages to a greater degree and particularly for compositions which are more catalytically active and more stable under the conditions to which such catalysts are exposed during use. Such improved compositions should remain effective for longer periods of time in the presence of the variety of materials normally present in the exhaust gases of internal combustion engines operated on fuels containing tetraalkyllead antiknock compounds and with lubricating oils containing additives containing compounds of such elements as sulfur and phosphorus.

The rare earth metal cobaltites proposed for use as exhaust gas oxidation/reduction catalysts by the workers mentioned in the preceding paragraphs are metal oxide compounds of the perovskite type, in contrast with, e.g., the pyrochlore, spinel, ilmenite, fluorite, rutile, titania, etc., types of crystalline minerals, as was recognized by Libby and others. The chemistry of the perovskites and factors related to their formation with particular metals are discussed on pages 496–520 of a chapter "Mixed Metal Oxides" in Volume 1 of "Progress in Inorganic Chemistry," F. A. Cotton, editor, Interscience, New York, 1959. The perovskites are discussed in detail, with long lists of metal oxides identified as to crystal type, tables, graphs relating compositions and physical properties, and complete bibliographies, in Landolt-Bornstein, "Numerical Data and Functional Relationships in Science and Technology," New Series, 1970, by Goodenough and Longo in a chapter "Crystallographic and Magnetic Properties of Perovskite and Perovskite-related Compounds," on pages 126–314 of Volume 4 "Magnetic and Other Properties of Oxides and Related Compounds," and by Shiozuki, Furuhata et al., in Volume 3, "Ferro- and Antiferroelectrical Substances," on pages 16–22, 37–88, and 217–353.

SUMMARY OF THE INVENTION

The present invention comprises compositions having the perovskite $ABO_3$ crystal structure wherein from about 1 up to 20% of the B cation sites are occupied by ruthenium or platinum ions and the remainder of the B cation sites are occupied by ions consisting essentially of cobalt ions, and the A cation sites are occupied by lanthanide ions of atomic number 57 to 71 and ions of at least one metal of Group IA, IIA, and IVA of the Periodic Table having ionic radii of about 0.9 A to about 1.65 A, The types of A cations being proportioned so that not more than 50% of the cobalt ions are tetravalent, the remainder being trivalent. Preferably at least 5% of the cobalt ions are tetravalent.

THE DRAWINGS

DETAILED DESCRIPTION OF THE INVENTION

Figure 1:
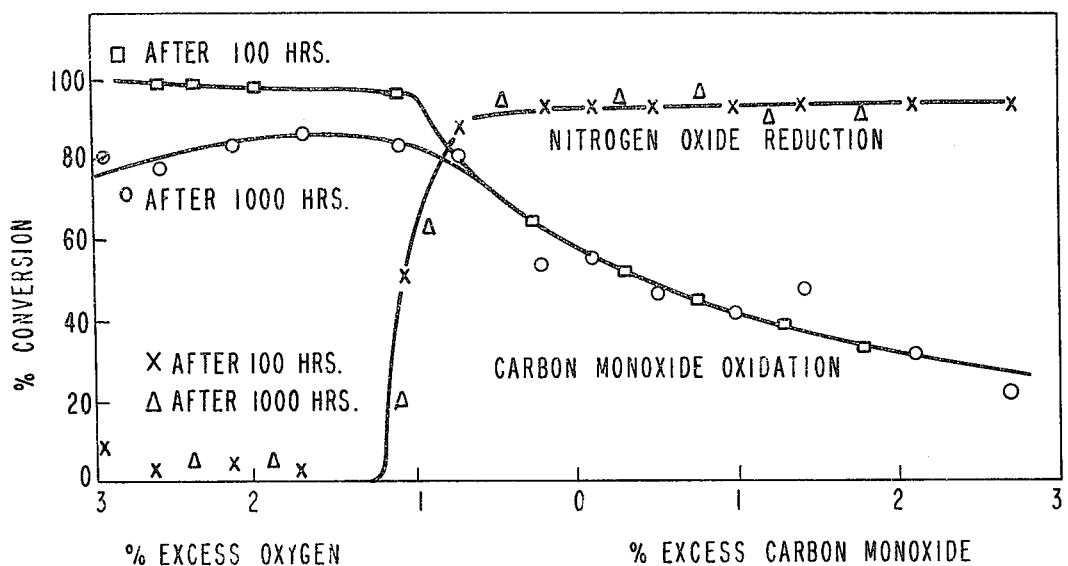
FIG. 1 shows the percentage conversion in the catalytic reduction of $NO_x$ and the oxidation of carbon monoxide as a function of excess CO and excess $O_2$ in internal combustion exhaust gas treated with the catalyst of Example 2.

The present invention is directed to novel metal oxide compounds having the perovskite-type structure characterized by B site cations consisting essentially of cobalt in the trivalent state, preferably mixed with cobalt in the tetravalent state and in addition minor amounts of ruthenium and/or platinum.

The metal oxide compounds described herein are oxides of the general empirical formula $ABO_3$ (equivalent to $A_2B_2O_6$, $A_3B_3O_9$, etc.) containing substantially equal numbers of cations of two different types of metals, called herein metals of Type A and metals of Type B, and at least two different metals of each of the two types. Thus they can be considered oxides of the formula $[A^1A^2 .. A^i][B^1B^2 .. B^i]O_3$ in which the total number of ions, $A^1, A^2, .. A^i$, is substantially equal to the total number of ions, $B^1, B^2, .. B^i$, and in which there are at least two different metals $A^1$ and $A^2$ of Type A and at least two different metals $B^1$ and $B^2$ of Type B. When in the ideal perovskite structure, such oxides contain cations of appropriate relative sizes and coordination properties and have cubic crystalline forms in which the corners of the unit cubes are occupied by the larger Type A cations (each coordinated with 12 oxygen atoms), the centers of the cubes are occupied by the smaller Type B cations (each coordinated with six oxygen atoms), and the faces of the cubes are occupied by oxygen atoms. Many variations and distortions of this fundamental cubic crystal structure are known among materials commonly considered to be perovskites or perovskite-like. Among the terms which have been used to describe variations of the cubic crystal structure of perovskite and perovskite-like metal oxides are rhombohedral, orthorhombic, pseudocubic, tetragonal, and pseudotetragonal.

In the compounds of the present invention at least 1% of the B cation sites are occupied by ruthenium or platinum ions. Ruthenium is capable of occupying all of the B cation sites, in a perovskite-type lattice; however little additional benefit is achieved when more than 20% of the sites are occupied by ruthenium. Platinum ions are larger than ruthenium ions and generally not more than about 10% of the B sites can be occupied by platinum with retention of a perovskite-type structure. Both platinum and ruthenium are tetravalent.

The remaining B site cations consist essentially of cobalt ions which are at least trivalent. Preferably from 5 to 50% of the cobalt ions are tetravalent. The valence state of the cobalt ions is determined by the choice and proportions of the A site cations as will become apparent hereinafter.

The A site cations in the compounds of this invention are less critical than the B site cations, the most important factor being the ionic radius. The effect of ionic radius on the existence of the perovskite structure has been discussed by many authors, e.g., Krebs "Fundamentals of Inorganic Crystal Chemistry", H. Krebs, McGraw Hill, London 1968. Assuming that the structure is formed by the packing of spherical ions, the relationship should hold when $$R_A + R_O = t\sqrt{2(R_B + R_O)}$$

$R_A$, $R_B$ and $R_O$ are the ionic radii of the A, B and oxygen ions respectively and t is a tolerance factor. With simple ternary compounds, $t = 0.9$ to 1 generally yields pure perovskite-type lattices. When $t = 0.8$–$0.9$ distorted perovskite lattices result. With the more complex compounds of the present invention somewhat wider departures from this idealized picture may occur, particularly when ions deviating in size from the ideal are present in small proportions. Generally, the A ions should have an ionic radius of from about 0.9 Å to about 1.65 Å, and preferably should exist in a single valence state. The ions of choice are selected from groups IA, IIA, IVA, lanthanum and the lanthanides, i.e., elements of atomic number 57 to 71 inclusive. The most preferred A cations are potassium, rubidium, strontium, and lead which are employed mixed with at least one ion of the lanthanides as defined above, and especially lanthanum.

In addition to the requirement that the total number of A cations should equal the total number of B cations, it is also required that the total charge of the cation (both A and B) should equal the charge on the oxygen atom.

By appropriate choice and proportioning of the A site cations, cobalt in the B site can be made to assume a mixture of two valence states. Thus the composition $[Sr_{0.2}La_{0.8}][Co_{0.9}Ru_{0.1}]O_3$ may be formulated $[Sr_{0.2}La_{0.8}][Co(III)_{0.8}Co(IV)_{0.1}Ru_{0.1}]O_3$.

The preferred compositions can be formulated $$[Sr_xLa_{1-x}][Co_{1-y}M_y]O_3$$

wherein M is Pt or Ru, and y is about 0.01 to 0.2 when M is Ru and about 0.01 to 0.1 when M is Pt. x is selected to give 5 to 50% of the cobalt ions in the tetravalent state. From the requirement of electrical neutrality it follows that $$(1-x) = (1-y)(1-f)$$

when f is the fraction of the tetravalent cobalt ions, that is, with the above limitations, $$(1-x) = 0.95(1-y) \text{ to } 0.5(1-y).$$

The compounds of this invention can be prepared by heating mixtures of metal oxides, hydroxides, metals, and/or metal salts for sufficient times at temperatures which permit spontaneous formation of the compounds. The mixture of materials which are heated are preferably finely subdivided and intimately mixed before heating and are thoroughly ground and mixed by any conventional techniques several times during the heating period, since the compounds are in many instances formed by atomic diffusion, without melting of any of the starting or potential intermediate materials, and are subject to coating of unreacted particles by reaction products. The heating times and temperatures required for the formation of significant amounts of these catalytic compounds depend upon the particular compositions being formed, the required times usually being shorter at higher temperatures. Temperatures above about 900°C are usually suitable for the formation of these compounds using firing times of hours to days with occasional intermediate grinding and mixing, but temperatures of 1000° to 1500°C may be used.

In forming the compounds of this invention, stoichiometric mixtures of starting materials are preferably heated in air or other oxygen-containing gas mixture.

The starting materials used in preparing the compounds of this invention by anhydrous processes can be any salts which are converted to oxides by prolonged heating in oxidizing atmospheres at the temperatures at which these compositions are formed. For example, they can be carbonates, salts of carboxylic acids (e.g., acetates, oxalates, tartrates, etc.), salts of the acids of sulfur (e.g., sulfides, sulfites, sulfates, etc.), halogen acid salts which are converted to oxides without volatilization (e.g., ruthenium chloride, strontium chlorate, barium perchlorate), salts of the acids of nitrogen (e.g., nitrates, nitrites, etc.). Preferably they are carbonates, nitrates or sulfates. The presence of small amounts of the salts of other such acids in a mixture which is predominately oxides or carbonates is usually not significantly deleterious since such salts are converted into oxides during heating to prepare these catalytic compositions.

The compounds of this invention are presumed to function as catalysts primarily at their surfaces, so compositions with significant surface areas are preferred. The surface areas of compounds prepared by heating mixtures of materials can be increased by grinding and other conventional methods. Catalytically active compounds with surface areas between about 0.1 and 10 square meters per gram (determined by the well-known Brunauer-Emmett-Teller method) can be obtained relatively easily. Compounds with surface areas greater than about one square meter per gram are preferred. The surface area of these compounds remains relatively unchanged during use by virtue of their compositional and structural stability at high temperatures.

The compounds described herein can be used as catalysts in the form of free-flowing powders, for instance, in fluid-bed reaction systems, or in the form of shaped structures providing efficient contact between the catalyst and the reactant gases. Such catalyst structures can contain minor (e.g., less than about 50%) or major (e.g., more than about 50 to about 98%) amounts of catalytically inert materials. These inert materials can be either porous or solid, with the catalytic compounds primarily on the surfaces thereof or more or less uniformly dispersed throughout. For example, the powdered compounds can be formed into porous catalyst pellets in which they are dispersed throughout by conventional techniques employing pellet presses, rolling mixers, extruders, etc. Preferably such pellets contain suitable dispersants, lubricants, and/or binders. One particularly useful dispersant-binder for use in forming extruded pellet catalyst structures containing the catalyst compositions described herein is a highpurity alpha alumina monohydrate sold by the Continental Oil Co. as "Dispal." This material is a white, free-flowing powder of small particle size formed of very fine ultimate crystallites having a surface area of about 200 square meters per gram and a bulk density of 45 to 50 pounds per cubic foot. It forms thixotropic dispersions at concentrations of about 3 to 30% in water containing about 4 to 6% commercial concentrated (37% HCl) hydrochloric acid based on the weight of alumina, which dispersions become thicker upon standing. Thick dispersions containing about 20 to 30 parts of the alumina monohydrate and about 100 to 150 parts of acidified water per 100 parts of a catalytic composition having a surface area of about two square meters per gram can be extruded through small orifices to obtain structures which retain their form when wet and have significant strength when dried of gross water and heated at about 500°C to about 900°C to remove at least a part of the water present in the alumina monohydrate.

The compounds of this invention are preferably employed as catalysts in the form of coatings on suitable refractory supports. Such supports can be in any convenient shape, including powders, granules, spheres, rings, tablets, pills, bars, tubes, extruded shapes, rolls, spirals, screens, beads, coils, and the more elaborate shapes (e.g., corrugated and flat sheets, honeycombs, etc.) prepared by a variety of methods and recently available to the art.

Suitable supports can be composed solely or primarily of silica, of ceramic compositions having softening or melting temperatures above the temperatures involved in forming or coating these catalytic compositions on such supports, of natural silicious materials such as diatomaceous earths and pumice, as well as of alundum, gamma alumina, silicon carbide, titania, zirconia, and other such refractory materials.

A particularly useful refractory support is an alumina ceramic described by Talsma in U.S. Pat. Nos. 3,255,027, 2,338,995, and 3,397,154. Such materials can be made by coating an aluminum foil fabricated into a shaped structure having the desired final configuration with a fluxing agent and firing to convert the aluminum into substantially pure alpha alumina. Suitable fluxing agents include alkali and alkaline earth metal oxides and compounds which yield such oxides on firing (e.g. sodium silicate) which serve to prevent inhibition or oxidation of the aluminum due to oxide scum formation on the surface of the aluminum. One such alumina contains, for example, small amounts of magnesium aluminate and aluminum silicate. As disclosed in the Talsma patents, honeycomb structures can be made by placing flux-coated corrugate sheets of aluminum together node-to-node and firing. Similar structures can be obtained by applying a composition containing aluminum powder, a binder, a fluxing agent, and a liquid carrier to a corrugated paper honeycomb structure and firing in an oxidizing atmosphere to burn out the paper structure and oxidize the aluminum to alumina. Honeycomb structures of such alumina compositions can be purchased from the Industrial Chemicals Department, E. I. du Pont de Nemours & Company, under the tradename "Torvex." The preferred structures have nominal cell size 1/16 to ¼ inch.

The compounds can be applied to suitable supports in several ways. For example, they can be formed upon supports which are sufficiently high melting and nonreactive by soaking the support structure in a solution of a suitable mixture of salts, drying, and firing the impregnated support to a temperature and for a time sufficient to form the catalytic structure. Alternately, the compounds can be preformed and applied to the support structure in a slurry which can optionally contain diluent materials which can also be catalytic materials. A particularly useful dispersant-binder for use in such slurry-coating processes is the "Dispal" alpha alumina monohydrate described hereinabove as a dispersant-binder useful in making extruded catalyst structures. Typically, acidified dispersions containing about 4 to 10% alpha alumina hydrate and a comparable amount of the ground catalytic composition are allowed to stand overnight to thicken, pieces of the support material are coated with the dispersion, the coated pieces are dried, and the dried coated pieces are heated to a temperature and for a time (e.g., for 2 to 24 hours at 500°C to 900°C) to remove at least a portion of the water from the alpha alumina monohydrate. The exact mechanism by which these compounds become bonded to supports by heating with such binders as alpha alumina monohydrate is not understood but may involve surface interaction between the compound, the alumina, and the support material. Other support materials and techniques for applying catalytic materials to supports, useful and effective with the compounds of this invention, are described by Sowards and Stiles in U.S. Pat. No. 3,518,206 and by Aarons in U.S. Pat. No. 3,554,929.

The metal oxides of the present invention are stable and durable at high temperatures and have been shown to catalyze the oxidation of hydrocarbons and carbon monoxide and also the reaction between nitrogen oxide ($NO_x$) and carbon monoxide to give nitrogen and carbon dioxide. They are not poisoned by the lead compounds present in the exhaust of internal combustion engines operated on leaded gasoline. Accordingly, an important use of the catalysts of this invention is the removal of noxious components from the exhaust of internal combustion engines. For this purpose the catalysts are preferably supported on shaped alumina supports, although other supports inert to the exhaust gas at the operating temperature may be used.

As formed by sintering and grinding, the compounds of the present invention are obtained in the form of a crystalline powder. Particularly effective and durable catalysts for use in treating the exhaust gases of internal combustion engines operating with leaded fuels are obtained when this powder is supported on an alumina support, preferably the honeycomb-structured alumina supports sold under the trade name "Torvex" described hereinabove. The catalyst powder should be applied to the surface, together with a binder to affix the same to the support, in an amount sufficient to coat the entire surface, usually in an amount of from 2 to 25% by weight of the support.

The catalytic compounds of the present invention may be employed to catlyze other reactions similar to the reactions occuring in the purification of internal combustion engine exhausts. For such applications, where lead compounds are absent, a wider variety of support materials may be employed such as pellets or other shaped structures of mullite, cordierite and silica.

This invention is further illustrated by the following specific examples which should not, however, be construed as fully delineating the scope of the discovery.

EXAMPLE 1

Preparation of Catalytic Composition

A metal oxide of the nominal composition [$Sr_{0.2}La_{0.8}$] [$Co_{0.8}Ru_{0.2}$]$O_3$ was prepared by mixing 10.96 grams of lanthanum oxide ($La_2O_3$), 2.48 grams of strontium carbonate ($SrCO_3$), 8.00 grams of cobalt carbonate ($CoCO_3$), and 2.24 grams ruthenium oxide ($RuO_2$), grinding and mixing until homogenous, and heating the mixture in air in a platinum boat inside a "Vycor" brand silica tube closed with glass wool plugs at 950°–1000°C for about 4 days during which the mixture was occasionally reground and remixed. There was no significant evidence of volatilization of ruthenium oxide or of its condensation in the cooler portions of the tube or in the glass wool plugs in the ends of the tube during the heating of the mixture. The resulting composition was ground and passed through a 325-mesh Tyler standard sieve screen.

Application of Catalytic Composition to a Support

One gram of "Dispal" M alumina dispersant and binder was mixed with 17 milliliters of water containing 3 drops of commercial concentrated hydrochloric acid. To this mixture was added 7.5 grams of the catalytic composition [$Sr_{0.2}La_{0.8}$] [$Co_{0.8}Ru_{0.2}$]$O_3$ described above to obtain a stable thixotropic slurry. A cylinder of alumina ceramic honeycomb with straight-through cells sold under the trade name "Torvex" was soaked in water. This cylinder weighed 5.77 grams, was about 2.5 centimeters in diameter and thickness and nominally had a cell size of 1/16 inch, wall thickness of 0.018 inch, open area of 50%, 253 hexagonal holes per square inch, and a nominal geometric surface area of 462 square feet per cubic foot. The water-soaked cylinder was dipped into the slurry of the catalytic composition, the gross excess of slurry was removed by blowing the cylinder with air, the cylinder was dried, and the cylinder coated with the catalytic composition and binder was heated for about 30 minutes in a muffle furnace at about 700°C. The cooled support was again dipped into the slurry, blown free of gross slurry, and dried and was then heated for about two hours in the muffle furnace at about 650°C. The support with adherent catalytic composition and binder weighed 7.74 grams, or 25.5% more than the dry uncoated support. It contained about 0.0106 gram of the catalytic composition and binder per square centimeter of geometric surface.

Catalytic Activity in The Reduction of Nitric Oxide by Carbon Monoxide

The "Torvex" ceramic honeycomb cylinder coated with [$Sr_{0.2}La_{0.8}$] [$Co_{0.8}Ru_{0.2}$]$O_3$ and binder was installed in a stainless steel chamber with a nominal internal diameter of 2.5 centimeters, height of 2.5 centimeters, and volume of 12.3 cubic centimeters. Nitrogen containing about 2000 parts per million of nitric oxide and about 10,000 parts per million of carbon monoxide was passed through the chamber at a nominal hourly space velocity of about 40,000 hr.$^{-1}$ and pressure of 1 pound per square inch gage while the feed gas and the catalyst chamber were heated in a programmed manner so that the temperature of the gas entering the catalyst chamber increased from about 60°C to about 600°C over about 90 minutes. Samples of the inlet and exit gases were obtained periodically. The nitric oxide in these samples was oxidized to nitrogen dioxide and the resulting gas mixture was analyzed by a modification of the colorimetric procedure described by B. E. Saltzman in "Analytical Chemistry," Volume 26, pages 1949–1955 (1954). The percent reduction in the nitric oxide concentration of the gas upon passing through the catalyst chamber was found to be nil at a catalyst chamber inlet temperature of 200°C, 14.3% at 300°C, 97.1% at 400°C, 98.6% at 500°C, and 98.6% at 600°C. The catalyst temperature was about 660°C with the gas entering the catalyst chamber at 600°C. From a smooth curve through a plot of these results it was estimated that the conversion of nitric oxide was 25% at about 315°C, 50% at about 340°C, and 90% at about 390°C and that the "light-off" temperature (the intercept with the temperature axis of an extrapolation of the portion of the curve in which the degree of conversion changed rapidly with temperature) was about 280°C. The "light-off" temperature and the temperatures of 25, 50, and 90% conversion after heating the catalyst-coated honeycomb cylinder at about 900°C for 116 hours and for 216 hours are given in Table I along with similar data from evaluations of the catalytic activity of the compositions described in Examples 2 through 9.

Catalytic Activity in the Oxidation of Carbon Monixide

The catalytic activity of the above-described "Torvex" cylinder coated with $[Sr_{0.2}La_{0.8}][Co_{0.8}Ru_{0.2}]O_3$ in the oxidation of carbon monoxide was determined in a similar apparatus and by a similar procedure. Nitrogen containing about 10,000 parts per million of carbon monoxide and 10,000 parts per million of oxygen was passed through the catalyst chamber and the entering and exiting gas mixtures were analyzed chromatographically using a column containing granules of "Linde" 13X molecular sieve. The conversion of carbon monoxide was found to be 6.6% with a catalyst chamber inlet temperature of 140°C, 7.1% at 200°C, 5.4% at 245°C, and 100% at 275°C and at 305°C. The temperature of the catalyst was 330°C with a catalyst chamber inlet temperature of 275°C. From a smooth curve through a plot of these results it was estimated that the conversion of carbon monoxide was 25% at about 250°C, 50% at about 260°C, and 90% at about 270°C and that the "light-off" temperature was about 245°C. The "light-off" temperatures and the temperatures of 25, 50, and 90% conversion after heating the catalyst-coated honeycomb cylinder at about 900°C for 116 hours and for 216 hours are given in Table I along with similar data for evaluations of the catalytic activity of other compositions described in Examples 2 through 10.

Catalytic Activity in the Oxidation of Propane

The above-described "Torvex" ceramic honeycomb cylinder coated with $[Sr_{0.2}La_{0.8}][Co_{0.8}Ru_{0.2}]O_3$ and binder was heated in a muffle furnace at about 900°C for 116 hours. The catalytic activity of the cylinder in the oxidation of propane was then determined in a similar apparatus and by a similar procedure. Nitrogen containing about 1300 parts per million of propane and 880 parts per million of oxygen was passed through the catalyst chamber and the entering and exiting gases were analyzed chromatographically using a column containing 80–100 mesh "Poropak" Q. The conversion of propane was found to be 7.9% with a catalyst chamber inlet temperature of 190°C, 8.9% at 285°C, 29.9% at 385°C, 78.0% at 505°C, and 94.6% at 600°C. The catalyst temperature was 605°C with a catalyst chamber inlet temperature of 505°C. From a smooth plot of these results it was estimated that propane conversion was 25% at about 250°C, 50% at about 415°C, 75% at about 490°C and 90% at about 565°C and that the "light-off" temperature was about 290°C. The "light-off" temperature and the temperatures of 25, 50, and 90% conversion after heating the catalyst-coated honeycomb at about 900°C for 216 hours are given in Table I along with similar data from evaluations of the catalytic activity of other compositions described in Examples 2 through 10.

TABLE I (Part A)

Catalytic Activity of Compositions of Examples 1 Through 5

| Example | 1 | 1 | 1 | 2 | 3A | 3B | 3B | 4 | 4 | 5 | 5 |
|---|---|---|---|---|---|---|---|---|---|---|---|
| Hours at 900°C.: | 0 | 116 | 216 | 0 | 0 | 0 | 220 | 0 | 620 | 0 | 100 |
| Reduction of Nitric Oxide | | | | | | | | | | | |
| "Light-off" temp., °C. | 280 | 280 | 285 | 265 | 255 | 205 | 275 | 290 | 285 | 295 | 290 |
| 25% conversion, °C. | 315 | 315 | 315 | 300 | 290 | 265 | 320 | 320 | 310 | 320 | 325 |
| 50% conversion, °C. | 340 | 340 | 345 | 330 | 325 | 330 | 360 | 345 | 340 | 350 | 355 |
| 90% conversion, °C. | 390 | 390 | 390 | 375 | 385 | 465 | 470 | 390 | 385 | 390 | 410 |
| Oxidation of Carbon Monoxide | | | | | | | | | | | |
| "Light-off" temp., °C. | 245 | 205 | 210 | 220 | | 175 | 200 | 205 | 210 | 205 | 190 |
| 25% conversion, °C. | 250 | 215 | 235 | 240 | | 230 | 240 | 215 | 225 | 230 | 275 |
| 50% conversion, °C. | 260 | 230 | 260 | 255 | | 280 | 285 | 235 | 245 | 250 | 310 |
| 90% conversion, °C. | 270 | 255 | 300 | 290 | | 395 | 425 | 255 | 270 | 315 | 550 |
| Oxidation of Propane | | | | | | | | | | | |
| "Light-off" temp., °C. | | 300 | 275 | 265 | 400 | 275 | 250 | 355 | 285 | 300 | 350 |
| 25% conversion, °C. | | 350 | 360 | 465 | 495 | 425 | 425 | 430 | 395 | 415 | 535 |
| 50% conversion, °C. | | 415 | 425 | 530 | 555 | 535 | 545 | 470 | 485 | 500 | — |
| 90% conversion, °C. | | 565 | 590 | — | — | — | — | 545 | — | — | — |

TABLE I (Part B)

Catalytic Activity of Compositions of Examples 6 Through 10

| Example | 6 | 6 | 7 | 7 | 8 | 8 | 9A | 9A | 9B | 9B | 10 | 10 |
|---|---|---|---|---|---|---|---|---|---|---|---|---|
| Hours at 900°C.: | 0 | 200 | 0 | 100 | 0 | 300 | 0 | 100 | 0 | 100 | 0 | 100 |
| Reduction of Nitric Oxide | | | | | | | | | | | | |
| "Light-off" temp., °C. | 290 | 250 | 310 | 270 | 325 | 285 | 295 | | 290 | 275 | 280 | 260 |
| 25% conversion, °C. | 325 | 280 | 330 | 305 | 365 | 325 | 320 | | 330 | 315 | 305 | 295 |
| 50% conversion, °C. | 345 | 315 | 350 | 335 | 410 | 370 | 350 | | 370 | 345 | 335 | 330 |
| 90% conversion, °C. | 390 | 370 | 380 | 385 | 485 | 470 | 395 | | 435 | 395 | 380 | 385 |
| Oxidation of Carbon Monoxide | | | | | | | | | | | | |
| "Light-off" temp., °C. | 220 | 205 | 185 | 210 | 210 | 170 | 150 | | 245 | 240 | 240 | 210 |
| 25% conversion, °C. | 235 | 225 | 200 | 230 | 225 | 205 | 215 | | 275 | 260 | 270 | 225 |
| 50% conversion, °C. | 250 | 245 | 210 | 245 | 240 | 240 | 245 | | 305 | 290 | 305 | 240 |
| 90% conversion, °C. | 275 | 275 | 275 | 270 | 295 | <290 | 290 | | 350 | 345 | 370 | 265 |
| Oxidation of Propane | | | | | | | | | | | | |
| "Light-off" temp., °C. | 390 | 260 | 280 | 270 | 385 | 315 | 325 | | 340 | 320 | 500 | 340 |
| 25% conversion, °C. | 455 | 325 | 445 | 360 | 450 | 455 | 415 | | 440 | 380 | 500 | 425 |
| 50% conversion, °C. | 515 | 395 | 505 | 425 | 515 | 530 | 465 | | 510 | 445 | — | 505 |
| 90% conversion, °C. | — | — | — | — | — | — | 580 | | — | — | — | — |

EXAMPLE 2

Preparation of Catalytic Composition

A metal oxide having the nominal composition $[Sr_{0.2}La_{0.8}][Co_{0.9}Ru_{0.1}]O_3$ was prepared by dissolving 351.8 grams of lanthanum nitrate $(La(NO_3)_3 \cdot 5H_2O)$, 44.5 grams of strontium nitrate $(Sr(NO_3)_2)$, and 275.5 grams of cobalt nitrate $(Co(NO_3)_2 \cdot 6H_2O)$ in about 4 liters of water, adding quickly and with rapid agitation a solution of 402.5 grams of potassium carbonate $(K_2CO_3)$ in about 2 liters of water, separating the precipitated mixture of carbonates, drying the separated carbonates overnight at 120°C, adding 14.0 grams of ruthenium oxide $(RuO_2)$, mixing thoroughly, heating in a muffle furnace at about 1000°C for 1 hour, grinding and mixing thoroughly, and then heating at about 950°C for 4 days during which the composition was ground and mixed at 3 intermediate times. The resulting black composition was ground and passed through a 325-mesh Tyler standard sieve screen. It contained 4.0% ruthenium, determined by X-ray fluorescence spectroscopy and comparable to the 4.22% ruthenium indicated by the formula and included in the preparation.

Another preparation showed that an equivalent composition as obtained when ruthenium oxide was added to a precipitated mixture of carbonates before separating the mixture from the supernatant liquid.

The X-ray diffraction pattern of the above-described catalytic composition $[Sr_{0.2}La_{0.8}][Co_{0.9}Ru_{0.1}]O_3$ indicated the composition to be a single phase having a structure of the perovskite type similar to that of $LaCoO_3$. The precision of cell dimensions calculated from this pattern was reduced by the presence in the pattern of broad and/or weak lines reflecting, in part, the introduction of small fractions of strontium and ruthenium into $LaCoO_3$. Crystal cell dimensions calculated from some of the lines of the X-ray pattern indicated a cell volume of 56.39 cubic Angstroms per formula unit, which value is significantly different from the corresponding dimensions of the known perovskites $LaCoO_3$ (cell volume 55.960), $Sr_{0.2}La_{0.8}CoO_3$ (cell volume 56.13) and $SrRuO_3$ (cell volume 60.45). The different cell volume reflects the expected enlargement of the crystal cell upon introduction of a small amount of ruthenium into the CoO structure of $Sr_{0.2}La_{0.8}CoO_3$.

Application to a Support

The above-described catalyst composition $[Sr_{0.2}La_{0.8}][Co_{0.9}Ru_{0.1}]O_3$ was applied to pieces of "Torvex" alumina ceramic honeycomb substantially as described in Example 1, using a thick thixotropic slurry containing 53 grams of "Dispal" M alumina dispersant and binder, 3 milliliters of commercial concentrated hydrochloric acid, and 20 grams of the catalyst composition in 453 milliliters of water. The ceramic honeycomb pieces were of two types: one piece like that described in Example 1 and 6 pieces each about 5.0 centimeters in diameter and 2.5 centimeters thick and weighing about 34 grams, with a nominal cell size of ⅛ inch, wall thickness of 0.03 inch, open area of 60%, area per roughly hexagonal hole of 0.01 square inch, and geometric surface area of 384 square feet per cubic foot. The dried and heated coated pieces weighed about 20% more than the dried untreated pieces. The larger coated pieces contained about 0.0127 gram of the catalyst composition and the smaller piece contained about 0.0107 gram of the catalyst composition per square centimeter of the geometric surface area.

Catalytic Activity in Reduction of Nitric Oxide by Carbon Monoxide

The catalytic activity of the above-described smaller cylinder of "Torvex" alumina ceramic honeycomb coated with the composition $[Sr_{0.2}La_{0.8}][Co_{0.9}Ru_{0.1}]O_3$ and binder in the reduction of nitric oxide by carbon monoxide and in the oxidation of carbon monoxide was determined substantially as described in Example 1. The "light-off" temperatures and temperatures of 25, 50 and 90% conversion are given in Table I.

Catalytic Activity with Automotive Exhaust Gases

The 6 larger pieces of "Torvex" alumina ceramic honeycomb coated with $[Sr_{0.2}La_{0.8}][Co_{0.9}Ru_{0.1}]O_3$ and binder, weighing in all 246 grams, were mounted in an insulated stainless steel chamber bolted to the exhaust port of a "Kohler" Model K91 single-cylinder gasoline engine (8.86 cubic inches displacement, nominally 4 horsepower) fitted with an electronic spark ignition system and loaded with a heavy fan. The engine was operated at 3000 revolutions per minute at an air/fuel ratio of approximately 13.9, using an unleaded premium grade gasoline to which was added 2.0 grams per gallon of lead as "Motor Mix" tetraethyllead antiknock compound containing the usual amounts of ethylenedichloride and ethylenedibromide scavengers and a commercial premium grade heavy duty SAE 40 grade lubricating oil containing a typical combination of additives including phosphorus, sulfur, etc. The engine was overhauled at intervals of about 300 hours. Under these operating conditions the exhaust gas temperature was 690°–750°C (typically 720°C), the nominal gas hourly space velocity of exhaust gas through the catalyst chamber was about 18,000 hr.$^{-1}$, and the exhaust gas contained about 2.8% carbon monoxide, 0.1% nitrogen oxides, and 0.9% oxygen. % oxygen. nitrogen oxides were determined as described in Example 1 and the carbon monoxide and oxygen were determined chromatographically after condensing most of the water in the exhaust gas in a trap cooled by an ice bath and passing the remaining gas through a small-pore filter to remove entrained and particulate matter.

Figure 2:
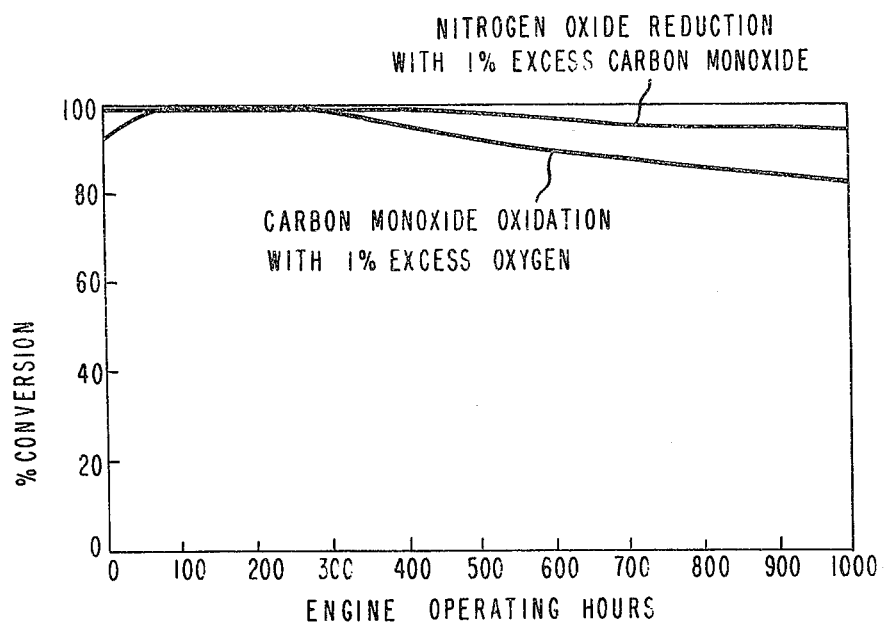
FIG. 2 shows the percentage conversion of $NO_x$ and CO as a function of time using the catalyst of Example 2.

After each 100 hours of steady-state operation under these conditions, the air/fuel ratio was increased to obtain in the exhaust gas about 3% excess oxygen, defined as Excess $O_2$ (%) = Measured $O_2$ (%) - 0.5 [Measured CO (%)]. The engine and catalyst were allowed to come to temperature equilibrium and the conversions of nitrogen oxides and of carbon monoxide were determined. This procedure was repeated with stepwise reduction of the air/fuel ratio until the exhaust gas contained about 3% excess carbon monoxide, defined as Excess CO (%) = Measured CO (%) - 2 [Measured $O_2$ (%)]. The conversions of nitrogen oxides and of carbon monoxide thus determined with different exhaust-gas compositions after 100 and 1000 hours of engine operation are shown in FIG. 1. Conversions of nitrogen oxides and of carbon monoxide obtained after 100-hour intervals from plots like that of FIG. 2 are shown in Table II and in FIG. 2. The temperature of the catalyst was typically 820°C during steady-state operation. After 1000 hours the catalyst weight 223 grams, representing a net loss from the catalyst chamber of 23 grams. The gasoline consumed during the 1000-hour test contained 468 grams of lead. During the test a total of 3075 grams of makeup oil was added to the engine crankcase.

EXAMPLE 3

Preparation of Catalytic Composition

Another metal oxide composition having the nominal formula $[Sr_{0.2}La_{0.8}][Co_{0.9}Ru_{0.1}]O_3$ was prepared by dissolving 441.2 grams of lanthanum nitrate ($La(NO_3)_3 \cdot 5H_2O$), 53.9 grams of strontium nitrate ($Sr(NO_3)_2$), 335.3 grams of cobalt nitrate ($Co(NO_3)_2 \cdot 6H_2O$) and 30.0 grams of ruthenium chloride $RuCl_3 \cdot 2H_2O$, containing about 41.5% Ru) in about 4 liters of water, adding slowly and with vigorous stirring a solution of 509.1 grams of potassium carbonate ($K_2CO_3$) in 1700 milliliters of water, separating the precipitated mixture of carbonates, drying at 120°C, under reduced pressure, heating for one hour at 1000°C, grinding and mixing thoroughly, and heating for an additional 3 days at 1000°C during which the bulk volume of the composition reduced from about 1200 milliliters to about 300 milliliters. The resulting black composition was ground and passed through a 325-mesh screen sieve. The X-ray diffraction spectrum of this composition was essentially identical with that of a composition of Example 2 and was substantially unchanged by heating for an additional 100 hours at 900°C.

Application of Catalytic Composition To a Support

Procedures similar to those of Example 2 were used to apply the above-described catalytic composition $[Sr_{0.2}La_{0.8}][Co_{0.9}Ru_{0.1}]O_3$ to cylinders of "Torvex" alumina ceramic honeycomb of the 2 sizes described in Example 2. The coated cylinders weighed 15.2 to 18.2% more than the dry uncoated cylinders.

Catalytic Activity of Supported Composition

The catalytic activity of the above-described alumina ceramic honeycomb coated with the composition $[Sr_{0.2}La_{0.8}][Co_{0.9}Ru_{0.1}]O_3$ and binder in the reduction of nitric oxide by carbon monoxide and in the oxidation of propane were determined substantially as described in Example 1. The "light-off" temperature and the temperatures of 25, 50 and 90% conversion are given in Table I.

Catalytic Activity of Supported Composition with Automotive Exhaust Gases

The above-described coated alumina ceramic honeycomb cylinders had substantially the same catalytic activity as the catalyst of Example 2 in the reduction of nitrogen oxides and in the oxidation of carbon monoxide in automotive exhaust gases in a 1000-hour test substantially identical to that described in Example 2. Table II includes conversions of nitrogen oxides and of carbon monoxide obtained at 100-hour intervals during this test.

Preparation of Extruded Catalyst Composition

A thick paste containing 50 grams of the above-described catalytic composition $[Sr_{0.2}La_{0.8}][Co_{0.9}Ru_{0.1}]O_3$, 42.5 grams of "Dispal" alumina dispersant and binder, 12.5 drops of commercial concentrated hydrochloric acid, and 62.5 milliliters of water was extruded under pressure through a hole nominally 0.125 inch in diameter. The extruded forms so obtained were dried at 120°C under reduced pressure, broken into segments about 0.25 inch long, and heated for 100 hours at about 900°C.

Catalytic Activity of Extruded Catalyst Composition

These extrusion products containing the catalytic composition $[Sr_{0.2}La_{0.8}][Co_{0.9}Ru_{0.1}]O_3$ and binder were placed in a catalyst chamber about 3.0 centimeters long and 1.5 centimeters in diameter and their catalytic activity in the reduction of nitric oxide with carbon monoxide, the oxidation of carbon monoxide, and the oxidation of propane was determined as described in Example 1 at an hourly gas space velocity of about 50,000 hr.$^{-1}$ before and after heating for an additional 220 hours at about 900°C. The "light-off" temperatures and the temperatures of 25, 50 and 90% conversion are given in Table I.

TABLE II

Catalytic Activity with Automotive Exhaust Gases Percent Conversion

| Hours Exposure | Example 2 Of CO with 1% Excess $O_2$ | Example 2 Of $NO_x$ with 1% Excess CO | Example 3 Of CC with 1% Excess $O_2$ | Example 3 Of $NO_x$ with 1% Excess CO |
|---|---|---|---|---|
| 0 | 93 | 99 | 99 | 97 |
| 100 | 100 | 99 | 98 | 97 |
| 200 | 100 | 99 | 98 | 99 |
| 300 | 97 | 99 | 96 | 97 |
| 400 | 93 | 99 | 96 | 96 |
| 500 | 90 | 98 | 95 | 98 |
| 600 | 92 | 96 | 89 | 98 |
| 700 | 88 | 95 | 91 | 96 |
| 800 | 86 | 95 | 88 | 96 |
| 900 | 84 | 95 | 84 | 96 |
| 1000 | 82 | 94 | 83 | 95 |

EXAMPLE 4

Preparation of Catalytic Composition

A metal oxide having the nominal composition $[Sr_{0.2}La_{0.8}][Co_{0.9}Ru_{0.1}]O_3$ was prepared by dissolving 50 grams of lanthanum nitrate ($La(NO_3)_3 \cdot 6H_2O$), 6.11 grams of strontium nitrate $Sr(NO_3)_2$), 38.0 grams of cobalt nitrate ($Co(NO_3)_2 \cdot 6H_2O$), and 3.4 grams of ruthenium chloride $RuCl_3 \cdot xH_2O$ containing about 41.5% ruthenium) in 500 milliliters of water, adding a solution of 57.7 grams of potassium carbonate ($K_2CO_3$) in 200 milliliters of water slowly and with vigorous stirring, separating the precipitated mixture of carbonates, drying at 120°C under reduced pressure, heating in a muffle furnace at 1000°C for 1 hour, grinding and mixing, and then heating at about 1000°C for 3 days with occasional grinding and mixing. The resulting catalytic composition was ground and passed through a 325-mesh sieve screen. The filtrate from the precipitated mixed carbonates contained an insignificant amount of ruthenium. The X-ray diffraction pattern of the catalytic composition (obtained with nickel-filtered CuK radiation) contained lines with the following Angstrom spacings and relative intensities: 3.86, 18%; 2.73, 100%; 2.23, 15%; 2.20, 6%; 1.92, 32%, 1.72, 26%; 1.36, 8%; 1.35, 7%.

Application of Catalytic Composition to A Support

Procedures similar to those of Example 1 were used to apply the above-described catalytic composition $[Sr_{0.2}La_{0.8}]$ $[Co_{0.9}Ru_{0.1}]O_3$ to two cylinders "Torvex" alumina ceramic honeycomb. The coated cylinders weighed 19.4% and 21.9% more than the dry uncoated cylinders.

Catalytic Activity of Supported Catalytic Composition

The catalytic activity of the above-described alumina ceramic honeycombs coated with the composition $[Sr_{0.2}La_{0.8}]$ $[Co_{0.9}Ru_{0.1}]O_3$ and binder was determined substantially as described in Example 1 to obtain the data given in Table I.

EXAMPLE 5

Preparation of Catalytic Composition on a Support

A support coated with a catalytic composition having the nominal formula $[Sr_{0.2}La_{0.8}]$ $[Co_{0.9}Ru_{0.1}]O_3$ formed on the support was prepared by soaking a cylinder of "Torvex" alumina ceramic honeycomb like that described in Example 1 in a solution of 10.0 grams of lanthanum nitrate $(La(NO_3)_3.6H_2O)$, 1.22 grams of strontium nitrate $(Sr(NO_3)_2)$, 7.57 grams of cobalt nitrate $(Co(NO_3)_2.6H_2O)$, and 0.735 grams of ruthenium chloride $(RuCl_3.xH_2O, 39.71\% Ru)$ in 100 milliliters of water, drying the cylinder at 120°C under reduced pressure, heating the cylinder for 30 minutes at 1000°C, soaking the cylinder again in the solution, drying the cylinder, and heating the cylinder overnight at 1000°C. The coated and heated cylinder weighed 3.4% more than dry uncoated cylinder.

Catalytic Activity of Supported Catalytic Composition

The catalytic activity of the above-described alumina ceramic honeycomb coated with the composition $[Sr_{0.2}La_{0.8}]$ $[Co_{0.9}Ru_{0.1}]O_3$ was determined substantially as described in Example 1 to obtain the data given in Table I.

EXAMPLE 6

Preparation of Catalytic Composition

A metal oxide having the nominal composition $[Ba_{0.2}La_{0.8}]$ $[Co_{0.9}Ru_{0.1}]O_3$ was prepared by dissolving 25 grams of lanthanum nitrate $(La(NO_3)_3.6H_2O)$, 3.77 grams of barium nitrate $(Ba(NO_3)_2)$, 19 grams cobalt nitrate $(Co(NO_3)_2.6H_2O)$ and 1.79 grams of ruthenium chloride $(RuCl_3.2H_2O$, about 41.5% Ru) in 250 milliliters of water, adding slowly and with stirring a solution of 28.9 grams of potassium carbonate $(K_2CO_3)$ in 100 milliliters of water, separating the precipitated mixture of carbonates, drying at 120°C under reduced pressure, heating in a muffle furnace at 1000°C for 1 hour, grinding and mixing, and heating at 1000°C for 4 days with occasional grinding and mixing. The resulting catalytic composition was ground and passed through a 325-mesh sieve screen.

Application of Catalytic Composition to a Support

Procedures similar to those of Example 1 were used to apply the above-described catalytic composition $[Ba_{0.2}La_{0.8}]$ $[Co_{0.9}Ru_{0.1}]O_3$ to a cylinder of "Torvex" alumina ceramic honeycomb. The coated cylinder weighed 16.6% more than the dry uncoated cylinder.

Catalytic Activity of Supported Catalytic Composition

The catalytic activity of the above-described alumina ceramic honeycomb coated with the composition $[Ba_{0.2}La_{0.8}]$ $[Co_{0.9}Ru_{0.1}]O_3$ was determined substantially as described in Example 1 to obtain the data given in Table I.

EXAMPLE 7

Preparation of Catalytic Composition

A metal oxide having the nominal composition $[Sr_{0.2}RE_{0.8}]$ $[Co_{0.9}Ru_{0.1}]O_3$ in which RE represents a mixture of rare earth metals in substantially the proportions in which they occur in monazite ore was prepared substantially by the procedure described in Example 6 from 30.0 grams of mixed rare earth nitrate $(RE(NO_3)_3.5H_2O)$ containing nominally about 48% Ce, 24% La, 17% Nd, 5% Pr, 3% Sm, 2% Gd, 0.2% Y, and 0.8% other rare earth metals by weight as the oxides), 3.74 grams of strontium nitrate $(Sr(NO_3)_2)$, 23.1 grams of cobalt nitrate $(Co(NO_3)_2.6H_2O)$, and 3.74 grams of ruthenium chloride $(RuCl_3.2H_2O$, about 41.5% Ru). The X-ray diffraction pattern of the black catalytic composition so obtained contained lines with the following Angstrom spacings and the indicated relative intensities: 3.87, 9%; 2.72, 100%; 2.22, 10%; 1.92, 62%; 1.57, 22%; 1.56, 7%; 1.42, 7%; 1.35, 12%.

Application of Catalytic Composition to a Support

Procedures similar to those of Example 1 were used to apply the above-described catalytic composition $[Sr_{0.2}RE_{0.8}]$ $[Co_{0.9}Ru_{0.1}]O_3$ to a cylinder of "Torvex" alumina ceramic honeycomb. The coated cylinder weighed 22.2% more than the dry uncoated cylinder.

Catalytic Activity of Supported Catalytic Composition

The catalytic activity of the above-described alumina ceramic honeycomb coated with the composition $[Sr_{0.2}RE_{0.8}]$ $[Co_{0.9}Ru_{0.1}]O_3$ and binder was determined substantially as described in Example 1 to obtain the data given in Table I.

EXAMPLE 8

Preparation of Catalytic Composition

A metal oxide having the nominal composition $[Sr_{0.2}La_{0.8}]$ $[Co_{0.98}Ru_{0.02}]O_3$ was made by substantially the procedures of Example 1 from 16.0 grams of lanthanum oxide $(La_2O_3)$, 0.33 grams of ruthenium oxide $(RuO_2)$, 3.62 grams of strontium carbonate $(Sr(CO_3)_2)$, and 14.31 grams of cobalt carbonate $(CoCO_3)$. The X-ray diffraction pattern of the resulting black catalytic composition was not significantly different from that of a metal oxide having the nominal composition $Sr_{0.2}La_{0.8}CoO_3$. The surface area of the ground composition determined by the Brunauer-Emmett-Teller method, was 1.0 square meter per gram.

Application of Catalytic Composition to a Support

The above-described composition $[Sr_{0.2}La_{0.8}][Co_{0.08}Ru_{0.02}]O_3$ was applied to a cylinder of "Torvex" alumina ceramic honeycomb substantially as described in Example 1, using a slurry containing 7.5 grams of the composition 2.0 grams of "Dispal" alumina dispersant and binder, and 3 drops of commercial concentrated hydrochloric acid in 17 milliliters of water. The dried and heated ceramic honeycomb cylinder weighed 24% more than the dried uncoated cylinder.

Catalytic Activity of Supported Catalytic Composition

The catalytic activity of the above-described alumina ceramic honeycomb coated with the composition $[Sr_{0.2}La_{0.8}][Co_{0.98}Ru_{0.02}]O_3$ and binder was determined substantially as described in Example 1 to obtain the data given in Table I.

EXAMPLE 9

Preparation of Catalytic Composition

A metal oxide having the nominal composition $[Sr_{0.2}La_{0.8}][Co_{0.95}Ru_{0.05}]O_3$ was prepared substantially by the procedure of Example 6 using 400 grams of lanthanum nitrate $(La(NO_3)_3 \cdot 6H_2O)$, 49.0 grams of strontium nitrate $(Sr(NO_3)_2)$, 320 grams of cobalt nitrate $(Co(NO_3)_2 \cdot 6H_2O)$, and 15.9 grams of ruthenium chloride $(RuCl_3 \cdot xH_2O$, 39.71% Ru) in 4 liters of water and 461 grams of potassium carbonate $(K_2CO_3)$ in 1500 milliliters of water. The resulting black catalytic composition had an X-ray diffraction pattern similar to an oxide having the formula $Sr_{0.2}La_{0.8}CoO_3$ containing a trace of lanthanum oxide $(La_2O_3)$.

Application of Catalytic Composition to a Support

The above-described catalytic composition $[Sr_{0.2}La_{0.8}][Co_{0.95}Ru_{0.05}]O_3$ was applied to cylinders of "Torvex" alumina ceramic honeycomb by procedures substantially like those described in Example 1 to obtain cylinders containing in one set (9A) 11.8 to 16.1% catalyst composition and binder and in another set (9B) 3.2 to 6.4% catalyst composition and binder.

Catalytic Activity of Supported Catalytic Composition

The catalytic activity of the above-described alumina ceramic honeycombs coated with the composition $[Sr_{0.2}La_{0.8}][Co_{0.95}Ru_{0.05}]O_3$ and binder at a loading of about 13% was determined substantially as described in Example 1 to obtain the data given in Table I.

EXAMPLE 10

Preparation of Catalytic Composition

A metal oxide of the composition $[K_{0.2}Sr_{0.2}La_{0.6}][Co_{0.8}Ru_{0.2}]O_3$ was prepared from a mixture of 2.97 grams of potassium carbonate, 3.17 grams of strontium carbonate, 10.51 grams of lanthanum oxide, 10.23 grams of cobalt carbonate and 5.0 grams of ruthenium oxide dihydrate (43.5% Ru) by heating for 4 days in a furnace at 1000°C following the procedure of Example 1. The catalyst composition so prepared was coated onto a cylinder of aluminum ceramic honeycomb sold under the trade name "Torvex" by the procedure of Example 1, the combined weight of catalyst and binder and support being 15.6% by weight greater than the uncoated support.

Catalytic Activity

The catalytic activity of the above composition in the reduction of nitric oxide and the oxidation of carbon monoxide and the oxidation of propane is given in Table I.

EXAMPLE 11

Preparation of Catalytic Composition

The composition $[Sr_{0.2}La_{0.8}][Co_{0.9}Pt_{0.1}]O_3$ was prepared by dissolving 35.2 grams of lanthanum nitrate $(La(NO_3)_3 \cdot 5H_2O)$, 4.45 grams of strontium nitrate $(Sr(NO_3)_2)$, and 27.6 grams of cobalt nitrate $(Co(NO_3)_3 \cdot 6H_2O)$ in 500 milliliters of water, adding 40.3 grams of potassium carbonate in 200 milliliters of water and 2.43 grams of platinum dioxide $(PtO_2$, 84.2% Pt), separating the precipitated carbonates and added oxide, drying at 120°C under reduced pressure, and heating the dried mixture at 1000°C for 4 days with daily grinding and mixing. The resulting black catalytic composition was ground and passed through a 325-mesh sieve screen.

The X-ray diffraction of this catalytic composition showed it to be a nearly single-phase composition of the perovskite crystal type, with a few unidentified lines not attributable to platinum metal or to platinum dioxide and an indicated cell volume of 56.81 cubic Angstroms per formula unit. The size of the unit cell reflected the introduction of the relatively large platinum ion into the crystal lattice of $[Sr_{0.2}La_{0.8}][Co]O_3$ (cell volume 56.13).

Application to a Support

Procedures similar to those of Example 1 were used to apply the above catalytic composition to a cylinder of "Torvex" alumina ceramic honeycomb. The coated cylinder weighed 15.8% more than the dry uncoated cylinder.

Catalytic Activity of Supported Composition

The catalytic activity of the above-described alumina honeycomb coated with the described composition and binder was determined substantially as described in Example 1 to obtain the data given in Table III.

TABLE III

CATALYTIC ACTIVITY OF $[Sr_{0.2}La_{0.8}][Co_{0.9}Pt_{0.1}]O_3$

|  | Reduction of NO Hours at 900°C | | Oxidation of CO Hours at 900°C | | Oxidation of Propane Hours at 900°C | |
|---|---|---|---|---|---|---|
|  | 0 | 100 | 0 | 100 | 0 | 100 |
| Light-off °C | 300 | 390 | 210 | 215 | 250 | 285 |
| 25% Conversion °C | 325 | 355 | 225 | 235 | 410 | 390 |
| 50% Conversion °C | 350 | 370 | 245 | 250 | 500 | 475 |
| 90% Conversion °C | 390 | 390 | 275 | 280 | — | — |

I claim:

1. A compound having the perovskite-type $ABO_3$ crystal structure wherein
   from about 1 to up to 20% of the B cation sites are occupied by ruthenium or platinum ions and the remainder of the B cations sites are occupied by ions consisting essentially of cobalt ions, and
   the A cation sites are occupied by lanthanide ions of atomic number 57 to 71 and ions of at least one metal of Groups IA, IIA and IVA of the Periodic Table having ionic radii of about 0.9A to 1.65, and proportioned so that no more than 50% of the cobalt ions are tetravalent and the remaining cobalt ions are trivalent.

2. Composition of claim 1 having the formula $[Sr_xLa_{1-x}][Co_{1-y}Ru_y]O_3$ wherein y is from 0.01 to 0.2 and (1-x) is 0.95 (1-y) to 0.5 (1-y).

3. Composition of claim 1 having the formula $[Sr_xLa_{1-x}][Co_{1-y}Pt_y]O_3$ wherein y is from 0.01 to 0.1 and (1-x) is 0.95 to (1-y) to 0.5 (1-y).

4. A catalyst comprising a compound of claim 1 on a shaped support.

5. An article of claim 4 wherein said compound is preformed and is affixed to the support with a binder.

6. An article of claim 5 wherein said support is alumina.

7. An article of claim 6 wherein said alumina is shaped in the form of a honeycomb.

* * * * *